(12) United States Patent
Erden

(10) Patent No.: US 11,153,570 B2
(45) Date of Patent: *Oct. 19, 2021

(54) DETERMINING REDUNDANCY IN TRANSFORMED SENSOR DATA

(71) Applicant: Seagate Technology LLC, Fremont, CA (US)

(72) Inventor: Mehmet Fatih Erden, St. Louis Park, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,558

(22) Filed: May 27, 2020

(65) Prior Publication Data

US 2020/0288140 A1 Sep. 10, 2020

Related U.S. Application Data

(63) Continuation of application No. 16/189,018, filed on Nov. 13, 2018, now Pat. No. 10,701,363.

(51) Int. Cl.
| | |
|---|---|
| *H04N 5/92* | (2006.01) |
| *H04N 5/94* | (2006.01) |
| *H04N 5/93* | (2006.01) |
| *H04N 5/917* | (2006.01) |
| *H04N 19/137* | (2014.01) |
| *H04N 19/169* | (2014.01) |
| *H04N 19/63* | (2014.01) |
| *H04N 5/84* | (2006.01) |

(52) U.S. Cl.
CPC ......... *H04N 19/137* (2014.11); *H04N 5/917* (2013.01); *H04N 19/1883* (2014.11); *H04N 19/63* (2014.11)

(58) Field of Classification Search
USPC ........ 386/326, 265, 329, 328, 353, 355, 356
See application file for complete search history.

(56) References Cited

U.S. PATENT DOCUMENTS

| | | | |
|---|---|---|---|
| 6,011,901 A | 1/2000 | Kirsten | |
| 6,597,660 B1 | 7/2003 | Rueda et al. | |
| 7,886,034 B1 * | 2/2011 | Hartmann | G06F 3/0653 |
| | | | 709/223 |
| 8,121,985 B2 | 2/2012 | Krebs | |
| 8,224,931 B1 | 7/2012 | Brandwine et al. | |

(Continued)

OTHER PUBLICATIONS

Lawson et al., "Image compression using wavelets and JPEG2000: a tutorial", Electronics & Communication Engineering Journal, Jun. 2002, pp. 112-121.

(Continued)

*Primary Examiner* — Daquan Zhao
(74) *Attorney, Agent, or Firm* — Mueting Raasch Group

(57) ABSTRACT

Two or more video signals from two or more sensors are received and discrete wavelet transformations are performed on the two or more video signals. Temporally stationary and non-stationary background data is determined from the discrete wavelet transformations. Redundancies are determined using the temporally stationary background data, the redundancies indicating an overlap between the two or more video signals Data of the two or more video signals is stored without the redundancies to reduce a storage size.

20 Claims, 10 Drawing Sheets

(56) References Cited

U.S. PATENT DOCUMENTS

| | | |
|---|---|---|
| 8,489,760 B2 | 7/2013 | Visharam et al. |
| 8,599,266 B2 | 12/2013 | Trivedi et al. |
| 8,638,680 B2 | 1/2014 | Sen et al. |
| 9,087,098 B2 | 7/2015 | Lin et al. |
| 2003/0235338 A1* | 12/2003 | Dye .......................... G06T 9/00 382/232 |
| 2012/0197856 A1 | 8/2012 | Banka et al. |
| 2013/0097196 A1* | 4/2013 | Fuse ....................... G06F 16/50 707/758 |
| 2013/0318025 A1 | 11/2013 | Alemzadeh et al. |

OTHER PUBLICATIONS

Zhong et al., U.S. Appl. No. 16/597,911, filed Oct. 10, 2019.

\* cited by examiner

DETERMINING REDUNDANCY IN TRANSFORMED SENSOR DATA

CROSS-REFERENCE TO RELATED APPLICATIONS

This is a continuation of U.S. patent application Ser. No. 16/189,018 filed Nov. 13, 2018, the contents of which are incorporated by reference.

SUMMARY

The present disclosure is directed to determining of redundancies in discrete wavelet transformed sensor data. In one embodiment, two or more video signals are received from respective two or more sensors. Discrete wavelet transformations are performed on the two or more video signals. Temporally stationary background data and temporally non-stationary data are determined from the discrete wavelet transformations. Redundancies in the temporally stationary background data are determined. The redundancies indicate a partial overlap between the two or more video signals. Data of the two or more video signals is stored without the redundancies to reduce a storage size of the data.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

The present disclosure generally relates to distributed data storage and computation systems. Conventionally, client computing devices (e.g., personal computing devices) use local data storage and computation working on the signals either being collected or already collected by various sensors. In case of extra storage space needed, data is sent to the "cloud" where overall storage system at the cloud is optimized in terms of capacity, power, and performance. Use of cloud storage service is a cost effective solution to store large amounts of data. However, cloud storage may not always be ideal. For example, the user might desire not to store some specific data in the cloud, and the data stored in the cloud might not be available at all times because of bandwidth limitations. However, storing all the data locally can become costly and unmanageable.

Figure 1:
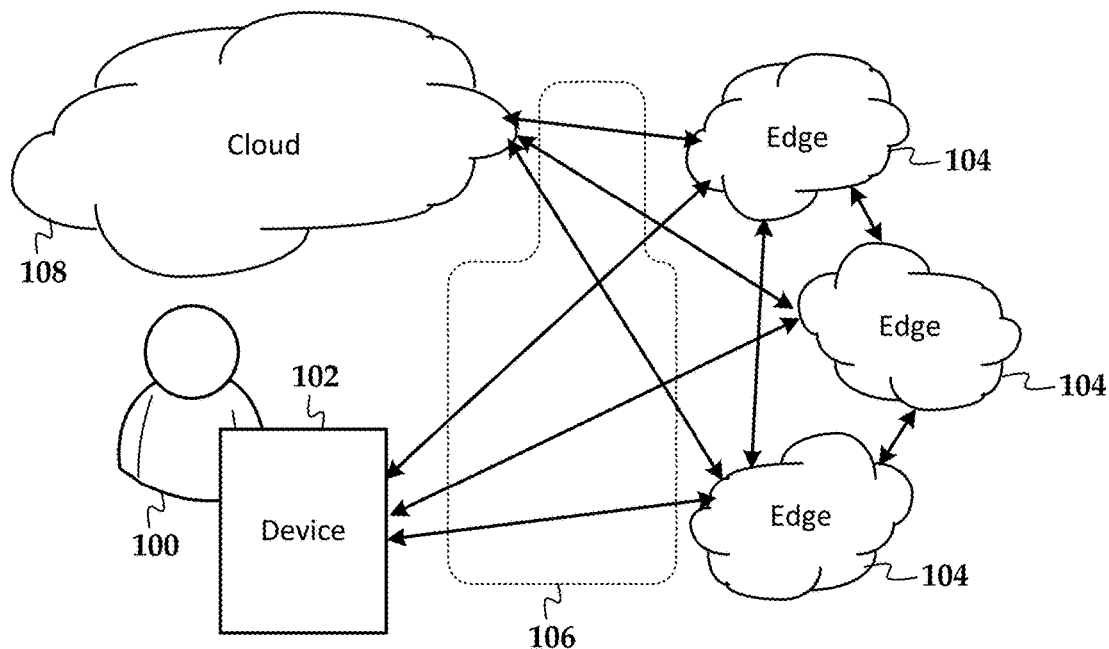
FIG. 1 is a block diagram of an edge node network according to an example embodiment.

In order to address these problems, new data storage system tiers, called "edges" are introduced. An example of a system using edge nodes according to an example embodiment is shown in the diagram of FIG. 1. An end user 100 is associated with one or more user devices 102 that may be fixed or mobile data processing devices such as desktop computers, laptop computers, mobile phones, tablets, wearable computing devices, sensor devices, external storage devices, etc. The user devices 102 are coupled to edge devices 104 via one or more networks 106. The edge devices 104 may be visualized as application-specific storage nodes local to the application, with their own sensors, compute blocks, and storage.

Eventually, some or all the data generated by the client devices 102 and edge devices 104 might be stored in a cloud service 108, which generally refers to one or more remotely-located data centers. The cloud service 108 may also be able to provide computation services that are offered together with the storage, as well as features such as security, data backup, etc. However, bandwidth-heavy computation and associated data flows can be done more efficiently within the edges 104 themselves. There can also be peer-to-peer data flow among edges 104. Because of the benefits offered by "edge" architectures, edge focused applications are increasing, and are starting to cover a wide variety of applications.

Figure 2:
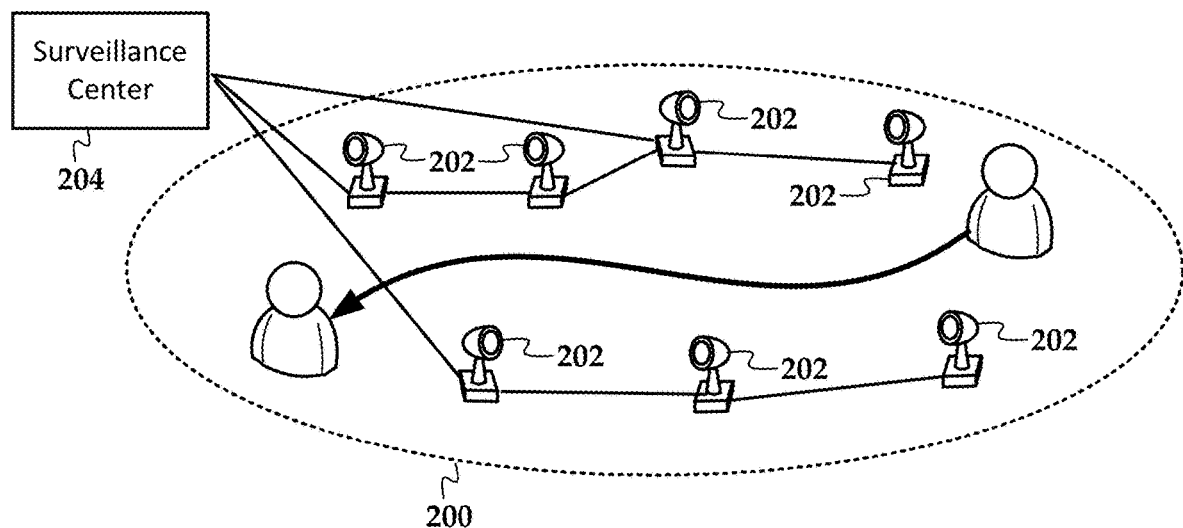
FIG. 2 is a block diagram of a surveillance system using edge nodes according to an example embodiment.

One specific case of an edge architecture is shown in the block diagram of FIG. 2, which illustrates a video recording system according to an example embodiment. This system may be used, for example, as surveillance system for a university campus. The purpose of such a system is to observe every location of the targeted premise 200 (the university campus in this example) at any time via a network of cameras 202. The cameras 202, together with a surveillance center 204, record all the data, compute to detect abnormalities or other features detected in the data, and report in a timely manner. The cameras 202 are configured as edge nodes, and therefore perform some level of computation and storage of the video data on their own.

Figure 3:
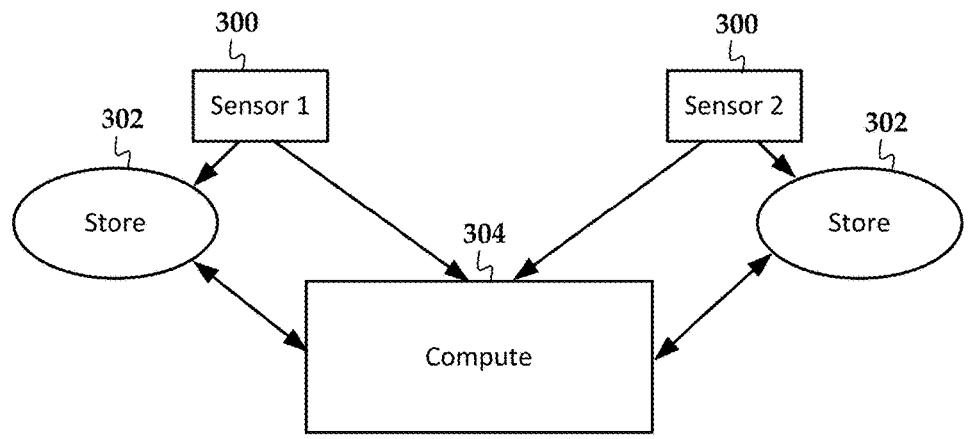
FIG. 3 is a block diagram of a compute and storage function according to example embodiments.

In order to meet the purpose of the whole system, the edge applications have "store" units used for data storage and "compute" block to execute the necessary computations for a given objective. For illustrative purposes, a block diagram in FIG. 3 shows two sensors 300 (e.g., cameras 202 in FIG. 2) connected to two storage blocks 302 and a compute block 304 according to an example embodiment. Those store blocks 302 can be attached to sensors 202 in FIG. 2, or they can be located in the surveillance center 204 along with the compute block 304.

The architecture shown in FIG. 3 may have significant data storage requirements, e.g., when raw sensor data is being stored. Different types of connections (e.g., sensor to store, sensor to compute, store to compute, compute to store) exist with different requirements. For those connections used to transfer raw sensor data, significant bandwidth may be required. The compute block 304 works with huge amount of raw sensor data to process those to extract the relevant information from the collection of signals. It might include deep-machine-learning type processors, and thus require complex coding and consume significant power to process the raw signals. The store blocks 302 likely hold sensitive data or data that has to be trusted. This data should be protected when consumed by the compute blocks, when stored awaiting processing, and when moved between different nodes. An ever-growing number of edge nodes in distributed systems increases the risk to data security.

Figure 4:
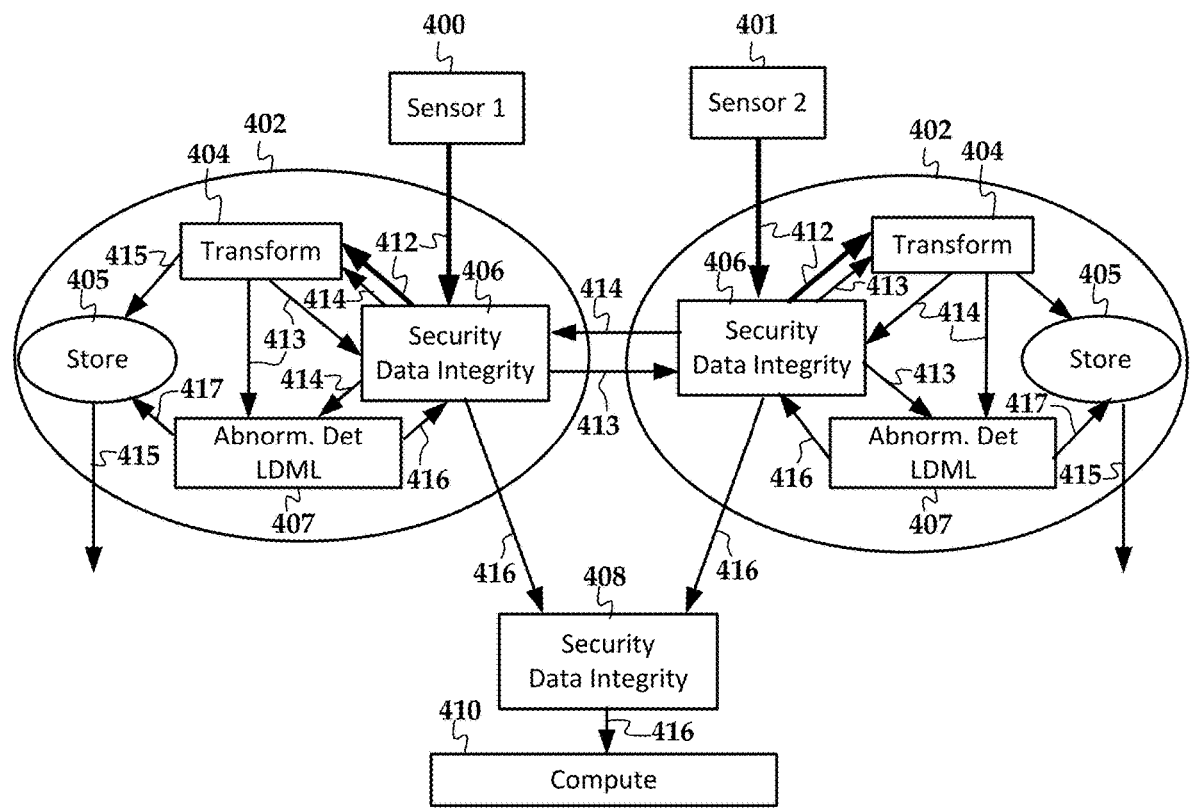
FIG. 4 is a block diagram of a sensor network according to an example embodiment.

In FIG. 4, a diagram shows a distributed data flow analytics architecture according to an example embodiment. This system can be optimized in terms of cost and bandwidth while ensuring system robustness and data security. As with the reference architecture in FIG. 3, the architecture shown in FIG. 4 includes storage nodes 402 that receive and store raw data from sensors 400, 401. The storage nodes 402 have expanded capability as will be described below, and communicate with a centralized security/data integrity block 408 and compute node 410 that collect data from a plurality of peer-level storage nodes 402.

Each storage node 402 is configured as a standalone network node that includes a security and daity module 406 that first processes raw sensor data 412 before it is processed elsewhere within the block 402. These modules 406 ensure that the storage blocks 405 within the storage nodes 402 are secure, as well as ensuring the security of data sent to the compute block 410. In addition to store and transmission lines being secure, this architecture also introduces distributed security. For example, if a subset of the storage node's 402 data is stolen either from the block 402 or elsewhere, the subset of data by itself means nothing. The data integrity function of the module 406 enrolls all nodes 402 with an agreement among each other regarding their presence, and stores data hashes on a ledger. This ensures that all stored data, including detected anomalies, are authenticated.

In order to provide robustness for data storage, the storage nodes 402 use controlled redundancy (like Redundant Array of Independent Disks, or RAID systems) for the data stored at the store blocks 405 using other nodes. This may involve identifying a RAID architecture for a given target system capacity and performance and collecting the store outputs 415 into groups that best serve system robustness improvements. For example, the store outputs 415 can be based on system bandwidth, reliability, or store unit physical location. A RAID-type system can be built with those RAID architecture groups. This distributed storage can be managed at a centralized entity (e.g., surveillance center 204 in FIG. 2), or can also be distributed to nodes in the overall system.

Each of the storage nodes 402 include a transformer module 404 that transforms the raw sensor data 412 to appropriate transform domains. The transformations may be used for all stored data (e.g., transformed domain representation is stored instead of raw data 412). In some cases, just a subset of raw data 412 is transformed and stored based on sensor resolution. The transformed data 413, 414 can be utilized for feature extraction to be used in deep machine learning to detect abnormalities via abnormality detection and local deep-machine learning (LDML) modules 407.

Note that the transformed data 413 from sensor 400 is given a different reference number than the transformed data 414 from sensor 401. This data 413, 414 is distributed between both storage nodes 402, which facilitates calculating redundancies between various sensor transform domain representations. These redundancies can be eliminated such that just the necessary and sufficient information is stored to extract the "scene of interest" observed by the sensors 400, 401. The data 413, 414 is input to the abnormality detection and local deep-machine learning modules 407 for feature extraction to detect abnormalities, for example.

The abnormality detection and local deep-machine learning modules 407 include local learning algorithms that are trained with "normal" signals such that they can detect the signals which are not "normal." For system robustness, snapshots of local deep machine learning block states can be stored (e.g., on the ledger for data integrity). The "abnormality detection" signal 417 can also be similarly stored and transferred with any other deep machine learning outputs. The compute block 410 receives the local deep machine learning output signals including the "abnormality detection" signals 416 to extract the final desired output.

The architecture shown in FIG. 4 provides improved data security in presence of ever-growing number of edge nodes via the security and data integrity modules 406. The abnormality detector module 407 can also be used to enhance security by detecting any local behavior that is out of the ordinary. The transformer modules 404 reduce the amount of data to be stored in the storage media 405. Thus, these modules 404 help to optimize the type of the media for a given sensor, and required storage capacity and performance. The feature extraction feature of the transformer modules 404 used for local deep-machine-learning algorithms reduces the complexity of the code for the modules 407 in each node. Also, the distributed compute design as shown in FIG. 4 with local and global compute blocks further reduces the complexity of the overall compute functionality and the final compute block 410.

The presence of abnormality detector and LDML modules 407 reduces the information flow from each node to the final compute block 410, thus reducing the overall bandwidth requirements of the system. The transformer modules 404 also help reduce the amount of raw sensor data 412 by sending a subset of transform domain representations for the local deep machine learning modules 407 to converge faster, hence reducing the system delay.

A number of variations can be made in the arrangement shown in FIG. 4. For example, a subset or all of the processing blocks within the storage nodes 402 can be combined together to optimize the required computation within each node. The sequence of the processing blocks within the storage nodes 402 can be different. For example, the transformer function 404 can be implemented before the security and data integrity function 406. Also, the transformer function 404 can be implemented on sensors 400, 401 instead of being included in the storage nodes 402. The transmission lines 413, 414 between the blocks 402 can be deleted, such that each block 402 utilizes its own sensor data instead of also receiving some form of sensor data from other nodes. The abnormality detector and LDML modules 407 within each node 402 can be moved to the compute block 410 outside the nodes in case the overall infrastructure for such a system has already been designed assuming that all compute will be done centrally.

The proposed architecture as shown in FIG. 4, or its modified versions form a building block that can be used in wide variety of applications. For example, this architecture can be used in surveillance systems, such as shown in FIG. 2. The architecture can be used with other kinds of video tracking systems, such as a shopping product identifier that eliminates the check-out process at the cashier. The purpose or the cost function of the surveillance system might be different, for example to detect a specific object instead of tracking all moving objects.

In other applications, the sensors 400, 401 can be voice sensor, humidity sensor, pressure sensor, chemical sensors, etc. The sensors 400, 401 can be mobile, e.g., example, attached to small robots, drones, mobile phones, smart autonomous cars, etc. The data collection via various sensors 400, 401 could have been done earlier with the data processing being be done much later, e.g., big data analytics applications. Also, the proposed processing blocks can be implemented in various locations and layers of the overall system design, for example: stand-alone chips, on the sensor, on a storage drive, on a system-on-a-chip (SoC) within the drive, within each rack in a data center, as a stand-alone console in a data center, etc.

In FIGS. 5-8, diagrams illustrate a particular example of transformation processing in a system according to an example embodiment. In this example, a discrete wavelet transform demonstrates how transform domain-based distributed data flow analytics can optimize cost and bandwidth in a system such as shown in FIG. 4. Generally, discrete wavelet transform involves decomposing signals into a series of wavelet domain representations, some being mutually orthogonal. In all the examples that follow, a Haar (Daubechies 1) wavelet kernel is used, but similar results can be obtained using other wavelet kernels as well.

Figure 5:
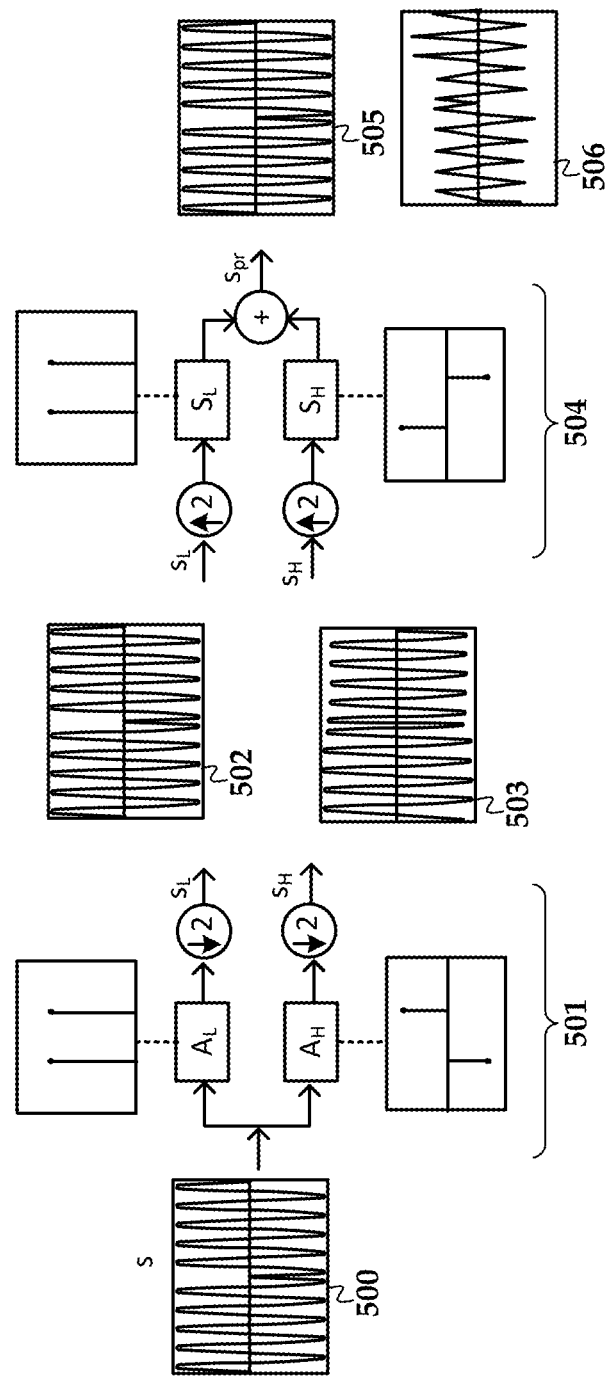
FIGS. 5, 6, 7, and 8 are block diagrams showing one-dimensional wavelet transforms according to example embodiments.

As seen in FIG. 5, an input signal 500 for this example is a sine wave of 1,000 samples with phase reversed in the middle. Using filtering and downsampling 501 with two orthogonal Wavelet analysis signals (corresponding to Haar kernel), the input signal 500 is decomposed into two orthogonal signal sets 502, 503 each with 500 samples. Using those orthogonal signal sets, a reconstructed input signal 505 is formed by synthesis filters 504. The difference 506 between the original input signal 500 and its reconstructed version 505 is on the order of $10^{-15}$, which is actually the resolution error of the computation, thus for practical purposes, the reconstruction 505 may be considered as perfect replica of the input signal 500.

Figure 6:
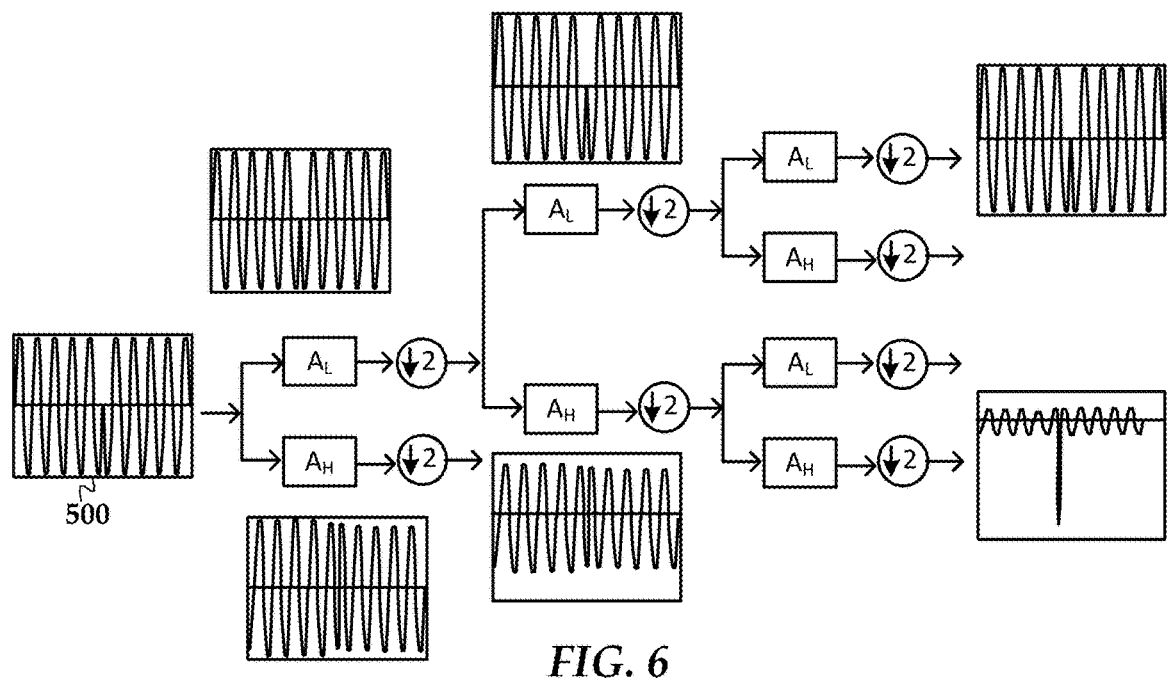
Figure 7:
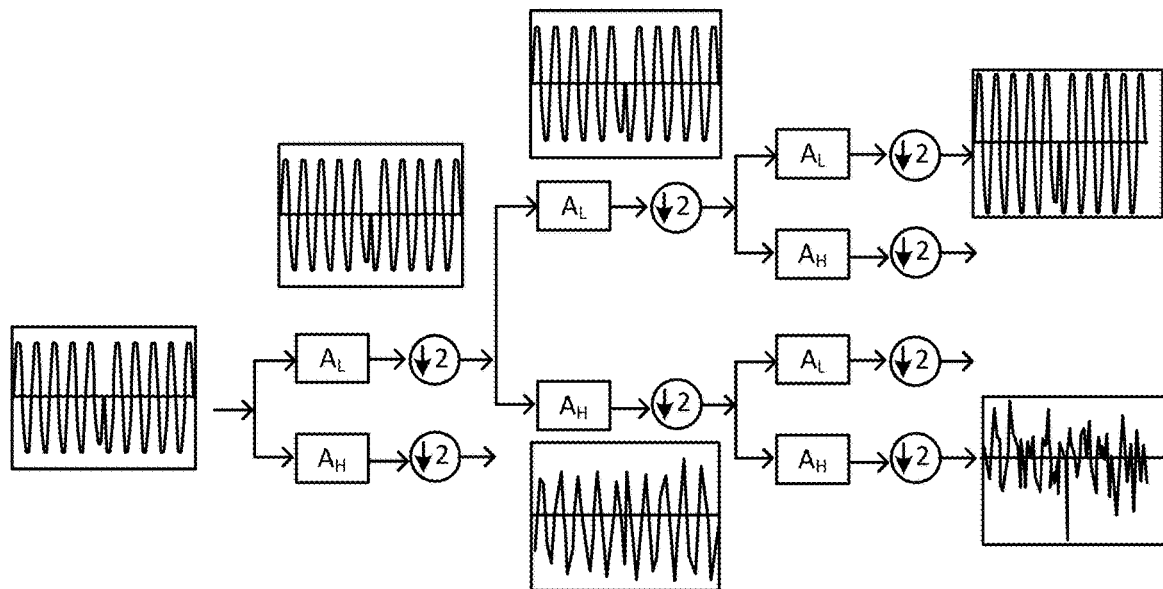

The analysis filters such as 501 can be applied at each branch and obtain the nested representations of the signal. A branched transform according to an example embodiment is shown in FIG. 6. As seen in this figure, the number of samples is reduced to get the "rough" estimate of the input signal with 125 samples, which is ⅛ of the original sample size. The input signal shown in FIG. 6 is a clean signal, e.g., generated using pure sinusoids. The transform shown in FIG. 6 is shown repeated with a noisy signal in FIG. 7, in which case white noise has been added to the clean input signal. As long as the amount of noise is not excessive, similar results can be obtained for noisy signals by using a final sample that is ⅛th of the size of the original signal.

Figure 8:
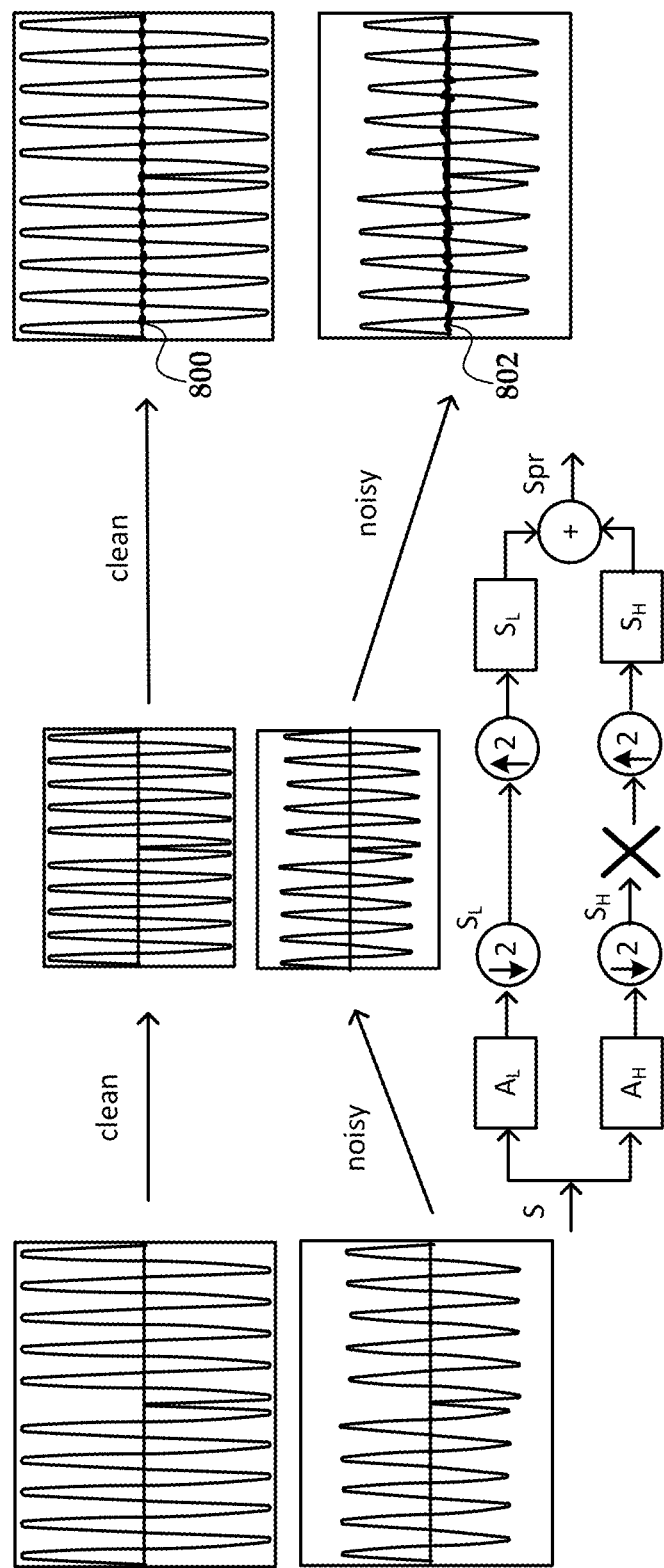

In FIG. 8, a diagram shows the use of a transform according to an example embodiment, but only using one of the branches to synthesize the original signal and quantify the difference. If the signal is clean, although the difference is small, there is pattern 800 in the difference signal which represents a loss of information in the recreated signal. In case of the noisy signal, the difference signal 802 mainly represents the noise in the system, and does not exhibit as much of a pattern.

In a system as described herein, a wavelet transform analysis can be used to extract the abnormalities (phase change in the example above) more clearly using fewer samples (⅛th in the example above). The original signal can be cleaned and reconstruct the original signal using fewer samples (using ½ in the example above) if the noise characteristics match the wavelet transform kernel. In the example above, in which white noise has been added, the Haar transform is selected, as it is designed to take differences of consecutive samples, hence works well in the presence of high frequency noise.

The examples above used one-dimensional (1-D) signals as inputs and outputs. In case of two-dimensional (2-D) signals, like images, the savings in the signal samples become more pronounced. For example, if the transformed version uses ½ the samples of the original image in a 1-D case, it becomes $(½)^2=¼$ the number of samples in 2-D case. Similarly, if the transformed version uses ⅛ of the original samples of the image in a 1-D case, it becomes $(⅛)^2=1/64$ the number of samples in a 2-D case.

Figure 9:
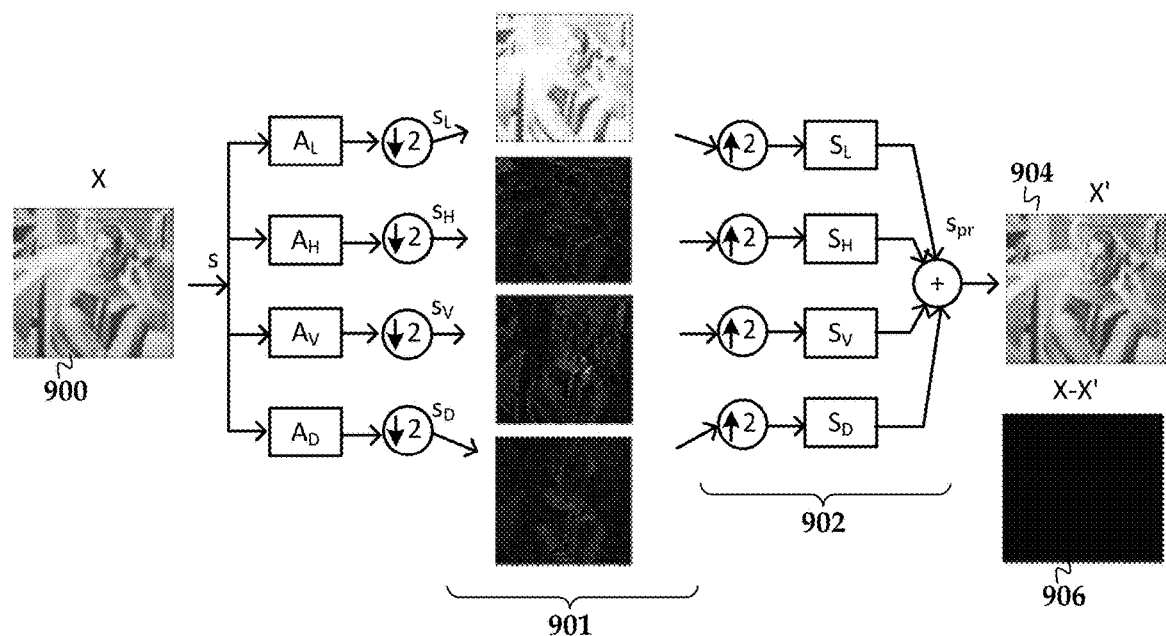
FIGS. 9 and 10 are block diagrams showing two-dimensional wavelet transforms according to example embodiments.
Figure 10:
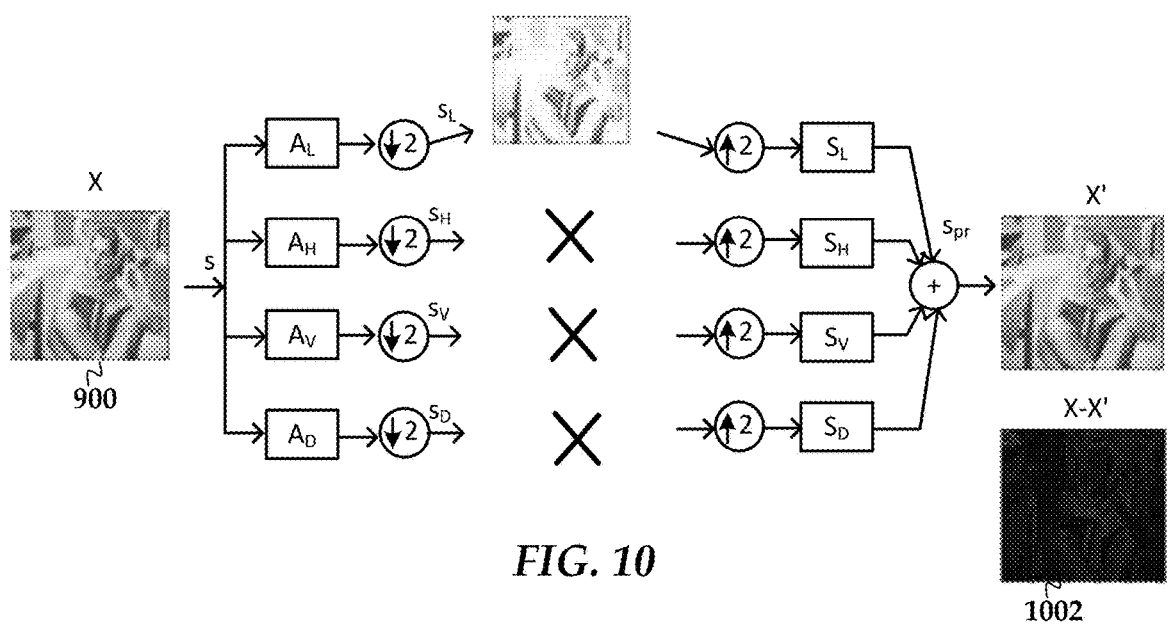

In FIG. 9, a diagram shows the use of a transform on a 2-D image according to an example embodiment. The input image 900 is decomposed into four orthogonal image sets/components 901 (average "L", horizontal detail "H", vertical detail "V", diagonal detail "D") each with ¼ samples of the original image using four orthogonal wavelet analysis signals corresponding to Haar kernel. Using those orthogonal image sets, a reconstruction 904 is synthesized via the synthesis filters 902. The difference image 906 shows no difference between the source 900 and reconstructed image. In FIG. 10, a diagram shows the same scenario only the average signal was used to reconstruct the image 900. As seen, the difference 1002 then shows details from the original image 900.

As pertains to system architectures shown in FIG. 4, the transform modules 404 can be optimized by characterizing the dominant noise sources and sensor resolution, and choosing an appropriate wavelet kernel based on expected performance of the transform. A portion of data (e.g., low frequency portions as shown in FIG. 8) can be stored based on sensor resolution and system noise. For a given feature extraction objective of the abnormality detection and local deep-machine learning modules 407, an appropriate wavelet kernel is selected. The kernel is used for feature extraction to be used in deep machine learning to detect abnormalities.

Figure 11:
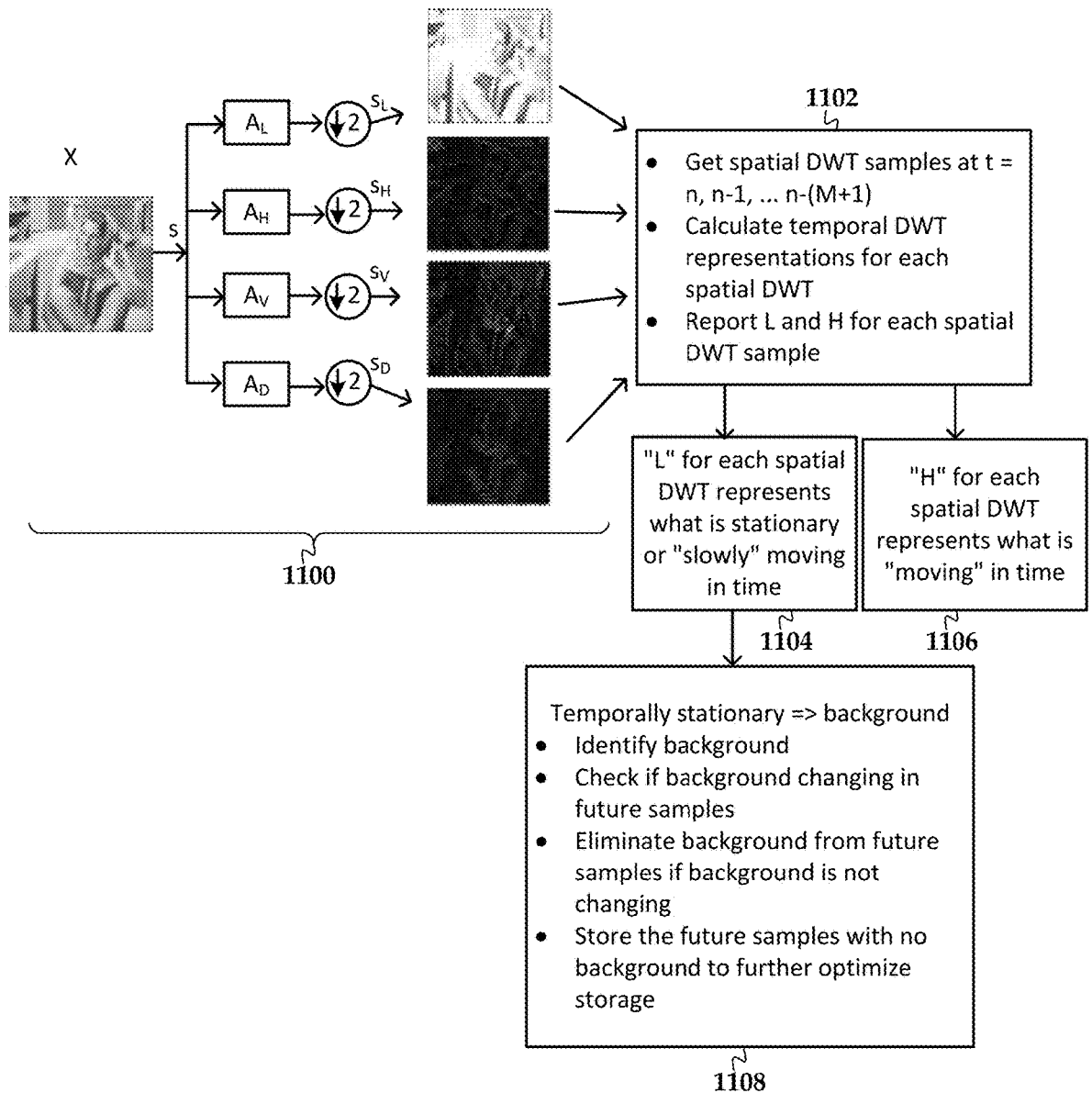
FIG. 11 is a block diagram showing the determination of stationary and non-stationary sensor data according to an example embodiment.

In FIG. 11, a diagram shows how a video analysis system according to an example embodiment reduces data storage requirements using wavelet transformations. The algorithm involves obtaining 1100 the spatial and temporal discrete wavelet transform (DWT) domain representations, similar to what is shown in FIGS. 9 and 10. As shown in block 1102, two components of the transform, $s_L$ and $s_H$, are obtained for a time-ordered series of M-images that form a segment of video. The series of these components $s_L$, $s_H$ are used to determine relatively slowly and quickly changing portions of the video images as indicated by blocks 1104, 1106. Temporal redundancies within each sensor signal are reduced or eliminated as indicated in block 1108. Note that other components (e.g., "V," "S") of the DWT may be used in block 1106 instead of "H" depending on the characteristics of the input signal and the features of interest in the machine-learning module.

Figure 12:
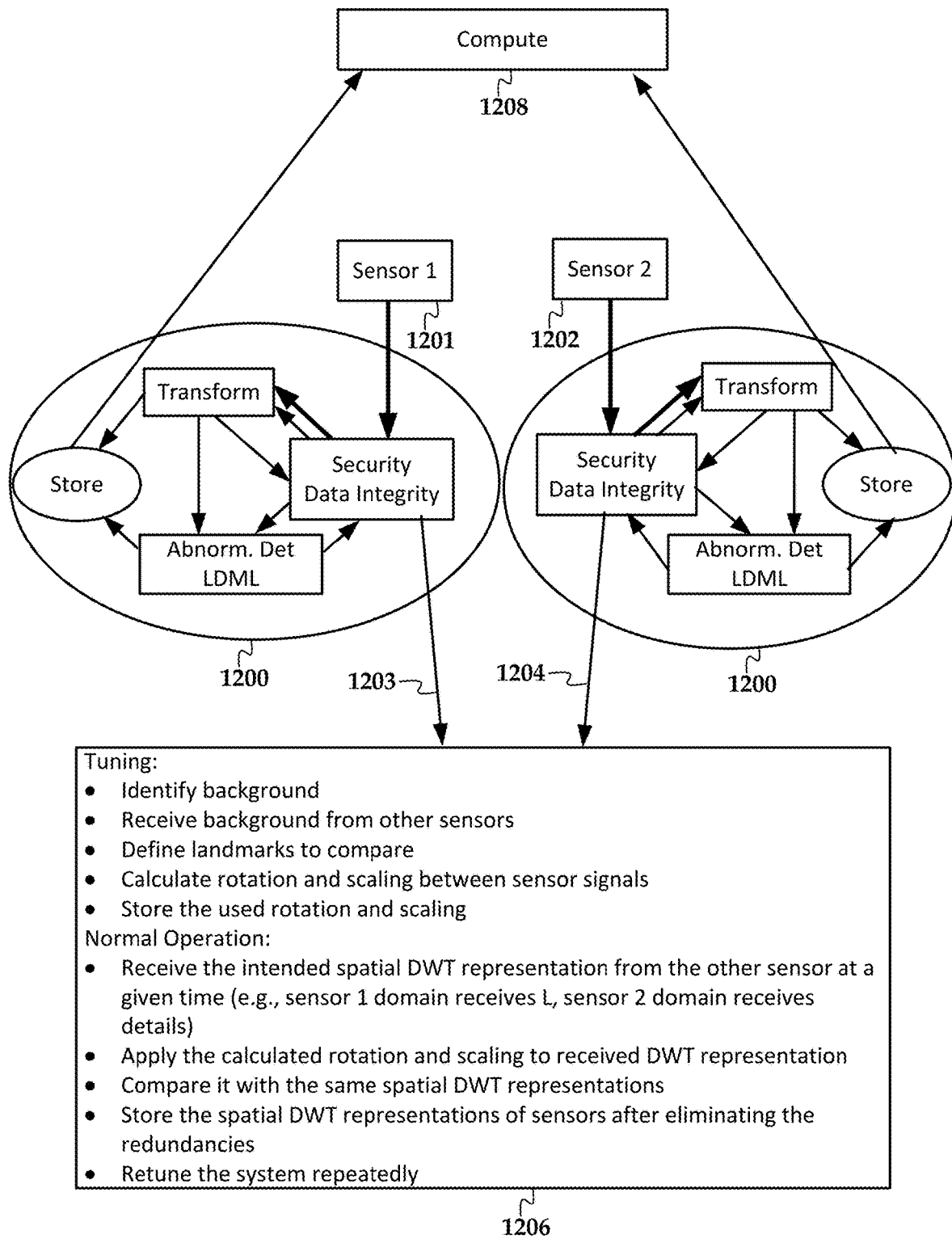
FIG. 12 is a block diagram showing the determination of redundancies among multiple sensor nodes according to an example embodiment.

In FIG. 12, a diagram illustrates how a system can eliminate spatial redundancies among sensor signals according to an example embodiment. In this embodiment, two or more storage nodes 1200 receive data from two or more sensors 1201, 1202. The sensor data is processed to extract the DWT component information 1203, 1204 such as shown in blocks 1104 and 1106 in FIG. 11. The processing in block 1206 can be performed within the blocks 1200 and/or a central compute node (e.g., compute node 410 shown in FIG. 4).

The processing in block 1206 involves a tuning phase which is performed initially and occasionally repeated. Each block 1200 identifies background in its own sensor's video streams and the blocks 1200 (and/or centralized node) also receives background from other sensors 1201, 1202 via other blocks 1200. The background data may be reduced in size by sending a subset of DWT components. For sensors 1201, 1202 that provide overlapping data, landmarks (or other identifiable static features) are defined for use in comparison of abnormalities (e.g., moving objects). Landmarks may be defined using machine learning, e.g., extracting features and finding common patterns from different sensors 1201, 1202.

In other cases, the sensors 1201, 1202 may include secondary sensors, such as digital compass, global positioning satellite sensing, detection of lens values, such that a geometric definition (e.g., a 3-D space) of the field of view of each sensor 1201 can be determined. The intersection of these geometries can be used to determine overlapping regions in the frame of reference of the two or more sensors 1201, 1202. The geometry data can be transmitted between nodes, e.g., using a similar path as the transformation data 1202, 1204, and may be done more than once if the orientation of the sensors 1201, 1202 changes over time.

Machine learning and/or secondary sensors may also be used to calculate rotation and scaling between sensor signals. This can be used to convert the overlapping data between the sensors 1201, 1202 into a common reference frame, from which abnormalities can be compared. The rotation and scaling is stored as part of the tuning, as well as a definition of the common background areas. In the latter case, the definition of the common background areas may be stored as a subset of the DWT components, or may be expanded to include all components of DWT for one or more representative images that are limited to the background regions.

During normal operation of the storage nodes 1200, the nodes 1200 receive the intended spatial DWT representation from the other sensors (and/or centralized node) at a given time. For example, data 1203 extracted from sensor 1201 may be used to derive the "L" (background) component of the DWT, and data 1204 extracted from sensor 1202 may be used to derive the "H" (detail) component of the DWT. The calculated rotation and scaling to are applied to the received DWT representations and compare with the same spatial DWT representations from the other sensors 1201, 1202 to determine redundancies. The spatial DWT representations of sensors 1201, 1202 are stored after eliminating the redundancies. This reduces an amount of data stored to only the non-redundant DWT representations, and may further be reduced by storing only a subset of the extracted spatial DWT components, e.g., just the "L" components for some nodes 1200. The extracted data sent outside of the storage nodes 1200 (e.g., to a centralized compute function) may also be reduced by including a subset of DWT components and only non-redundant information.

The redundancies found above may include temporally stationary and temporally non-stationary data. The background data determined using the above analysis may be considered redundant in time, thus only a few select partial images may need to be stored to reflect the background of the storage nodes 1200 over a relatively large period of time. Some part of this background data is overlapping in space between two sensors 1201, 1202, and so this may further reduce the size of the stored background data. The temporally non-stationary (e.g., "moving" object) may still be stored as time varying representations, although can be reduced in size by not storing spatial redundancies. For example, during time periods in which the same moving object is recorded by both sensors, the video representation of the moving object in one sensor may be discarded or stored in a reduced form (e.g., a few reduced images) as being spatially overlapping and redundant.

The ability to detect redundancies can reduce local storage at each node 1200, but can also be used for system-wide applications, as may be performed by a centralized compute device 1208. For example, the reduced data may be communicated from the peer-level storage nodes 1200 to the compute device 1208, along with other data indicating where overlaps occurred and between which nodes that the overlaps occurred. This can be used for system-wide correlation of the abnormality signals. For example, a moving object can be tracked as it moves from sensor 1201 to sensor 1202 and be identified as the same object due to the redundancy data determined by one or both of the storage nodes 1200.

Figure 13:
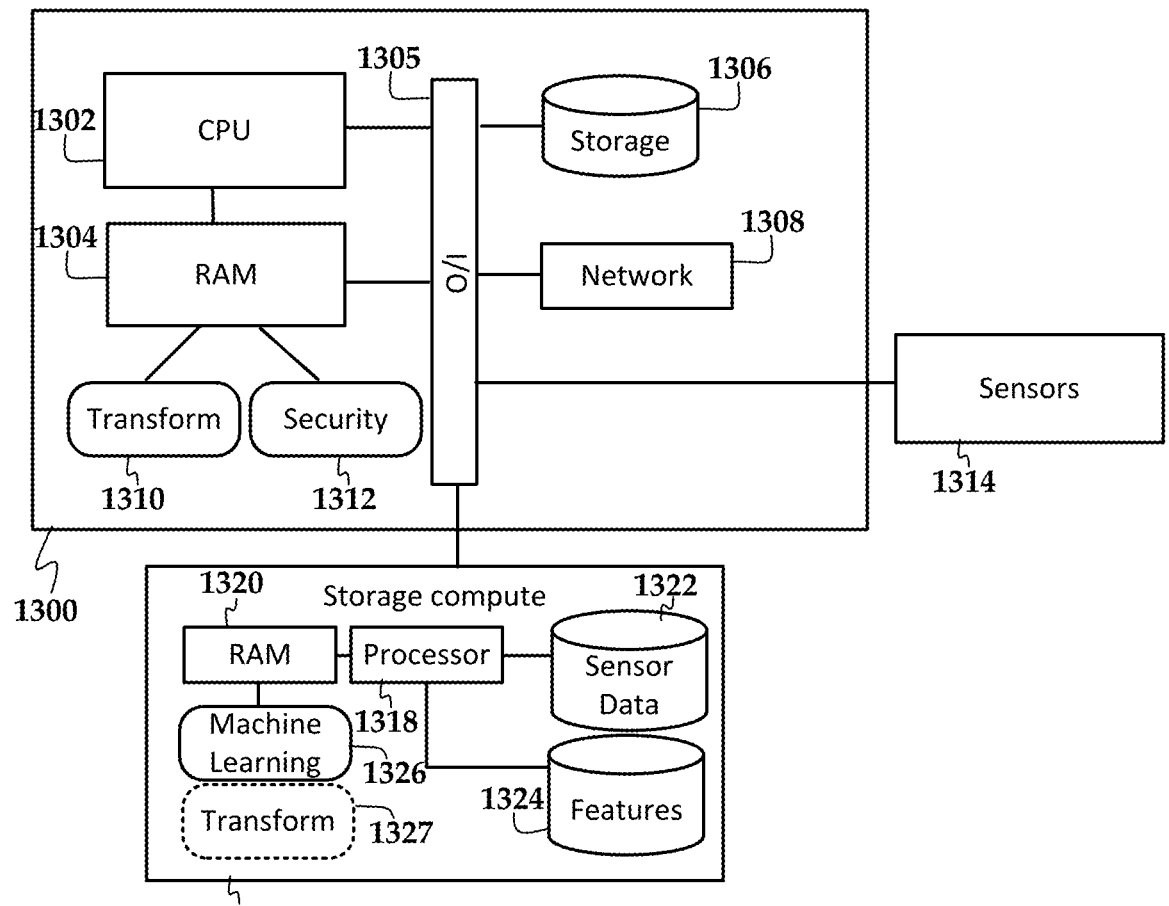
FIG. 13 is a block diagram of an apparatus according to an example embodiment.

In the embodiments described above, the network nodes may use conventional computer hardware, as well as hardware that is adapted for the particular functions performed within the respective networks. In FIG. 13, a block diagram shows components of an apparatus 1300 that may be included in some or all of these computing nodes. The apparatus 1300 includes a central processing unit (CPU) 1302 and volatile memory 1304, e.g., random access memory (RAM). The CPU 1302 is coupled to an input/output (I/O) bus 1305, and RAM 1304 may also be accessible by devices coupled to the bus 1305, e.g., via direct memory access. A persistent data storage 1306 (e.g., disk drive, solid-state memory device) and network interface 1308 are also shown coupled to the bus 1305.

Any of the embodiments described above may be implemented using this set of hardware (CPU 1302, RAM 1304, storage 1306, network 1308) or a subset thereof. In other embodiments, some computing nodes may have specialized hardware. For example, a storage node (e.g., storage nodes 402 as shown in FIG. 4) may utilize an internal or external sensor 1314 that is coupled to the I/O bus 1305. The storage node may be configured to perform certain computational functions, as indicated by transform and security modules 1310, 1312.

Note that the storage node 402 shown in FIG. 4 also included a deep-machine learning function 407 and storage blocks 405. The apparatus 1300 of FIG. 13 may implement those functions via the CPU 1302, RAM 1304, and storage 1306. However, FIG. 13 shows an alternate arrangement using a storage compute device 1316 that is coupled to the I/O bus of the apparatus 1300. The storage compute device 1316 includes its own processor/controller 1318 and RAM 1320, as well as storage sections 1322, 1324. The storage compute device 1316 has a physical envelope and electrical interface of an industry standard storage drive (e.g., 3.5 inch or 2.5 inch form factor), but includes additional processing functions as indicated by the machine learning module 1326 and optional transform module 1327.

The storage compute device 1316 accepts read and write requests via a standard data storage protocol, e.g., via commands used with interfaces such as SCSI, SATA, NVMe, etc. In addition, the storage compute device 1316 has application knowledge of the data being stored, and can internally perform computations and transformations (e.g., DWT) on the data as it is being stored. In this example, the sensor data (which can be transformed before being stored or stored in the raw form in which it was collected) can be stored in a sensor data storage section 1322. The features that are extracted from the sensor data by the machine learning module 1326 are stored in features storage section 1324. The sections 1324 may be logical and/or physical sections of the storage media of the device 1316. The storage media may include any combination of magnetic disks and solid-state memory.

The use of the storage compute device 1316 may provide advantages in some situations. For example, in performing some types of large computations, a conventional computer spends a significant amount of time moving data between persistent storage 1316, through internal I/O busses 1316, through the CPU 1302 and volatile memory (e.g., RAM 1304), and back to the persistent storage 1316, thus dedicating system resources to moving data between the CPU 1302 and persistent storage 1316. In the storage compute device 1316, the stored data 1322 is much closer to the processor 1318 that performs the computations, and therefore calculations that involve large data sets can be done efficiently within the storage compute device 1316, even if the processor 1318 is not as powerful as the CPU 1302.

Another application that may benefit from the use of a storage compute device 1316 where it is desired to keep the hardware of the apparatus 1300 generic and inexpensive. The storage compute device 1316 can be flexibly configured for different machine learning applications when imaging its storage media. Thus, a generic-framework apparatus 1300 can be used for different applications by attaching different sensors 1314 and storage compute devices 1316. The apparatus 1300 may still be configured to perform some operations such as security 1312 in a generic way, while the end-application customization that is largely contained in the storage compute device 1316.

Figure 14:
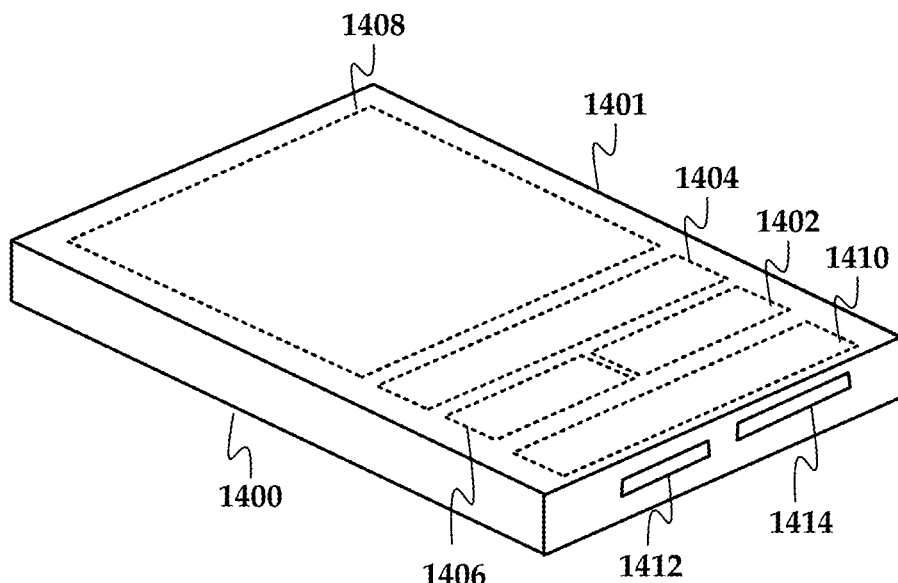
FIG. 14 is a perspective view of a storage compute device according to an example embodiment.

In FIG. 14, a block diagram shows a storage compute device 1400 according to an example embodiment. The storage compute device 1400 has an enclosure 1401 that conforms to a standard hard drive physical interface, such as maximum dimensions, mounting hole location and type, connector location and type, etc. The storage compute device 1400 may also include connectors 1412, 1414 that conform to standard drive physical and electrical interfaces for data and power. Note that while the standard drive interfaces were initially established for hard disks drives, a drive physical interface is also applicable to other persistent storage such as solid-state drives (SSD). Standards have been expanded to include interfaces storage devices (e.g., M.2 for SSD) that are not commonly used by hard disk drives.

A device controller 1402 may function as a central processing unit for the storage compute device 1400. The device controller 1402 may be a system on a chip (SoC), in which case it may include other functionality in a single package together with the processor, e.g., memory controller, network interface 1406, digital signal processing, etc. Volatile memory 1404 is coupled to the device controller 1402 and is configured to store data and instructions as known in the art. The network interface 1406 includes circuitry, firmware, and software that allows communicating via a network 1407, which may include a wide-area and/or local-area network.

The storage compute device 1400 includes a storage medium 1408 accessible via storage channel circuitry 1410. The storage medium 1408 may include non-volatile storage media such as magnetic disk, flash memory, resistive memory, etc. The device controller 1402 in such a case can process legacy storage commands (e.g., read, write, verify) via a host interface 1412 that operates via the network interface 1406. The host interface may utilize standard storage protocols and/or standard network protocols via the data interface 1412.

The storage compute device 1400 includes a portion of volatile and/or non-volatile memory that stores computer instructions. These instructions may include various modules that allow the apparatus 1400 to provide functionality for a sensor node as described herein. For example, the controller SoC 1402 may include circuitry, firmware, and software modules that perform any combination of security, transformation, and machine learning as described for the sensor node 400 shown in FIG. 4. The controller SoC 1402 may be able to parse and respond to commands related to these functions that are different than the legacy storage commands. For example, the controller SoC 1402 may receive queries via the host interface 1412 about where machine learning output data is stored so that it can be accessed by the host apparatus (e.g., apparatus 1300 in FIG. 13).

Figure 15:
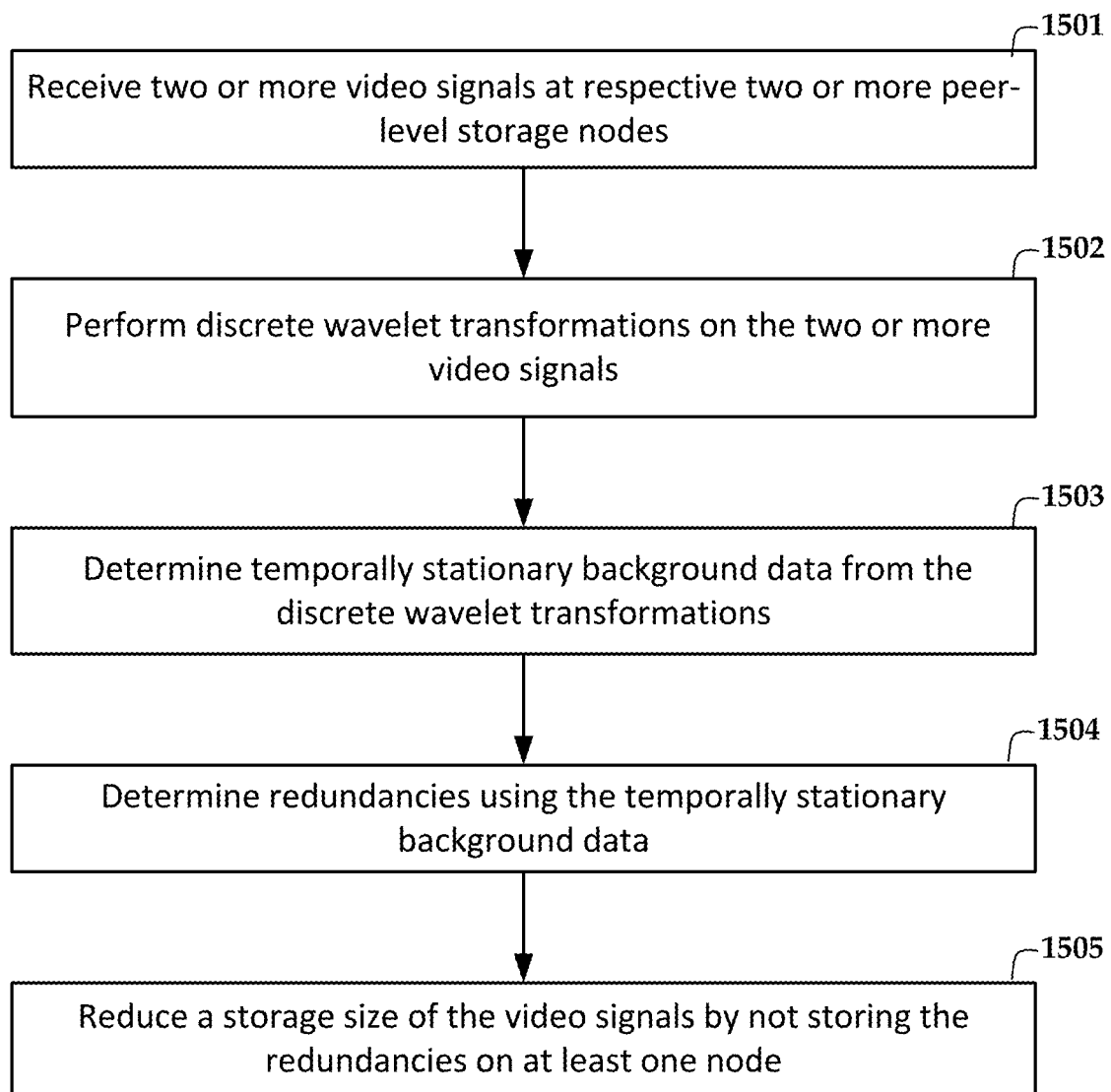
FIG. 15 is a flowchart of a method according to example embodiments.

In FIG. 15, a flowchart shows a method according to an example embodiment. The method involves receiving 1501 two or more video signals at respective two or more peer-level storage nodes. Discrete wavelet transformations are performed 1502 on the two or more video signals via the two or more peer-level storage nodes. Temporally stationary background data is determined 1503 from the discrete wavelet transformations at each of the two or more peer-level storage nodes. Redundancies are determined 1504 using the temporally stationary background data, the redundancies indicating an overlap between the two or more video signals. A storage size of at least one of the two or more video signals is reduced 1505 by not storing the redundancies on at least one of the peer-level storage nodes.

The various embodiments described above may be implemented using circuitry, firmware, and/or software modules that interact to provide particular results. One of skill in the arts can readily implement such described functionality, either at a modular level or as a whole, using knowledge generally known in the art. For example, the flowcharts and control diagrams illustrated herein may be used to create computer-readable instructions/code for execution by a processor. Such instructions may be stored on a non-transitory computer-readable medium and transferred to the processor for execution as is known in the art. The structures and procedures shown above are only a representative example of embodiments that can be used to provide the functions described hereinabove.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   receiving two or more video signals from respective two or more sensors;
   performing discrete wavelet transformations on the two or more video signals;
   determining temporally stationary background data and temporally non-stationary data from the discrete wavelet transformations;
   determining redundancies in the temporally stationary background data, the redundancies indicating a partial overlap between the two or more video signals; and storing data of the two or more video signals without the redundancies to reduce a storage size of the data.

2. The method of claim 1, wherein the two or more video signals are separately received at respective two or more edge nodes, the two or more edge nodes independently performing the discrete wavelet transformations on the two or more video signals and further independently performing the determining of temporally stationary background data and determining of the redundancies.

3. The method of claim 2, further comprising processing the two or more video signals at data integrity modules of the two or more edge nodes before the discrete wavelet transformation, the data integrity modules enrolling the two or more edge nodes in a distributed security agreement and storing hashes of the data of the two or more video signals on a ledger.

4. The method of claim 2, wherein storing of the data extracted by the two or more edge nodes comprises storing the data in a Redundant Array of independent Disks (RAID)-type system distributed between the two or more edge nodes.

5. The method of claim 2, wherein determining the redundancies further comprises scaling and rotating the temporally stationary background data from at least one of the edge nodes to obtain a common reference frame.

6. The method of claim 1, wherein storing the data comprises storing the temporally stationary background data as images at a larger time period between the images compared to a shorter time period between non-stationary images of the temporally non-stationary data.

7. The method of claim 1, further comprising determining second redundancies between the temporally non-stationary data resulting from the partial overlap between the two or more video signals, the data stored without the second redundancies.

8. The method of claim 1, further comprising:
determining second redundancies between the temporally non-stationary data resulting from the partial overlap between the two or more video signals; and
identifying a moving object moving between the two or more sensors as a same object based on the second redundancies.

9. An apparatus, comprising:
a network interface configured to receive two or more video signals from respective two or more sensors; and
one or more processors coupled to the network interface, the processor configured to:
perform discrete wavelet transformations on the two or more video signals;
determine temporally stationary background data from the discrete wavelet transformations;
determine redundancies using the temporally stationary background data, the redundancies indicating a partial overlap between the two or more video signals; and
store data of the two or more video signals without the redundancies to reduce a storage size of the data.

10. The apparatus of claim 9, wherein determining the redundancies further comprises scaling and rotating the temporally stationary background data from at least one of the two or more sensors to obtain a common reference frame.

11. The apparatus of claim 9, wherein storing the data further comprises storing the temporally stationary background data as images at a larger time period between the images compared to a shorter time period between non-stationary images of the temporally non-stationary data.

12. The apparatus of claim 9, further comprising determining second redundancies between the temporally non-stationary data resulting from the partial overlap between the two or more video signals, the data stored without the second redundancies.

13. The apparatus of claim 9, further comprising:
determining second redundancies between the temporally non-stationary data resulting from the partial overlap between the two or more video signals; and
identifying a moving object moving between the two or more sensors as a same object based on the second redundancies.

14. A system comprising:
two or more sensors providing respective two or more video signals that are accessible via a network;
and at least one processing node coupled to the network and operable to:
receive the two or more video signals;
perform discrete wavelet transformations on the two or more video signals;
determine temporally stationary background data and temporally non-stationary data from the discrete wavelet transformations;
determine redundancies between the temporally stationary background data, the redundancies indicating a partial overlap between the two or more video signals; and
store data of the two or more video signals without the redundancies to reduce a storage size of the data.

15. The system of claim 14, further comprising two or more edge nodes respectively coupled to the two or more sensors, wherein the two or more video signals are separately received at the respective two or more edge nodes, the two or more edge nodes independently performing the discrete wavelet transformations on the two or more video signals, wherein one of the two or more edge nodes is the at least one processing node.

16. The system of claim 15, further comprising processing the two or more video signals at data integrity modules of the two or more edge nodes before the discrete wavelet transformation, the data integrity modules enrolling the two or more edge nodes in a distributed security agreement and storing hashes of the data extracted by the two or more edge nodes on a ledger.

17. The system of claim 15, wherein storing of the data extracted by the two or more edge nodes comprises storing the data in a Redundant Array of Independent Disks (RAID)-type system distributed between the two or more edge nodes.

18. The system of claim 14, wherein storing the data further comprises storing the temporally stationary background data as images at larger time periods between the images compared to shorter time periods between non-stationary images of the temporally non-stationary data.

19. The system of claim 14, wherein the at least one processing node is further operable to determine second redundancies between the temporally non-stationary data resulting from the partial overlap between the two or more video signals, the data stored without the second redundancies.

20. The system of claim 14, wherein the at least one processing node is further operable to:
determine second redundancies between the temporally non-stationary data resulting from the partial overlap between the two or more video signals; and identify a moving object moving between the two or more sensors as a same object based on the second redundancies.

\* \* \* \* \*